United States Patent [19]
Tschink et al.

[11] 3,907,427
[45] Sept. 23, 1975

[54] LIGHTING ATTACHMENT FOR PHOTOGRAPHIC ENLARGERS

[76] Inventors: Werner Tschink, Nassauische Str. 4, 1 Berlin 31; Rudolf Beger, Gerdsmeyer Weg 6b, 1 Berlin 42, both of Germany

[22] Filed: Jan. 11, 1974

[21] Appl. No.: 432,795

[30] Foreign Application Priority Data
Jan. 13, 1973 Germany.................. 2302113

[52] U.S. Cl.............. 355/67; 240/41 R; 355/32; 355/71
[51] Int. Cl.² .............. G03B 27/54; G03B 27/76
[58] Field of Search .......... 355/35, 36, 37, 38, 67, 355/68, 69, 70, 71, 32; 240/41 R, 44.1

[56] References Cited
UNITED STATES PATENTS

| | | | |
|---|---|---|---|
| 2,438,303 | 3/1948 | Simmon | 355/36 |
| 2,855,823 | 10/1958 | Klaus | 355/67 |
| 2,991,692 | 7/1961 | Korf | 355/35 |
| 3,322,025 | 5/1967 | Dausen | 355/35 X |
| 3,458,254 | 7/1969 | Astor | 355/35 |
| 3,561,866 | 2/1971 | Cohen | 355/35 |
| 3,561,867 | 2/1971 | Simmon | 355/67 |
| 3,594,081 | 7/1971 | Tschink | 355/71 X |
| 3,756,712 | 9/1973 | Weisglass | 355/71 |

Primary Examiner—Samuel S. Matthews
Assistant Examiner—E. M. O'Connor
Attorney, Agent, or Firm—Allison C. Collard

[57] ABSTRACT

A lighting attachment for photographic enlargers having a light source for projecting an illuminated beam through a negative including a highly reflective double cone having its conical axis directed toward the light source, a semi-spherical hollow ball having a white internal wall surface surrounding said double cone and having an input opening on its curved surface between the cone and the light source and a light output opening disposed on the open flat portion of the ball, a diffusion disk closing the output opening of the ball for diffusing the light source and, a strip reflector disposed in the path of the light beam and having a surface for adjusting the reflection of the light before the light enters the photographic nagative. Variable filters are also provided for changing the color of the light reaching the negative.

14 Claims, 16 Drawing Figures

LIGHTING ATTACHMENT FOR PHOTOGRAPHIC ENLARGERS

This invention relates to a lighting attachment for photographic enlargement devices having a light source, wherein an arched mirror is provided in the path of the beam of the light source. The virtual picture of the light source is provided in one focus of the mirror, while the objective is provided in the other focus. The light, which is directed to the ellipsoidal mirror, is reflected by a mirror which is separated into a plurality of strip-like sections. The reflecting part of these strip-like sections is variable (see German Patent Application P 20 50 255.0).

In a known lighting attachment, a favorable partial and stepless variation of the light density is provided on the projection surface of the enlargement device. It is an object of the present invention to provide the individual elements in such a manner that space is saved, and the operation of the device is simplified. Furthermore, the present invention provides a lighting means in the attachment which delivers a stepless variable diffused light in the proper color tone.

This object of the invention is obtained by having the luminous beam of the lamp cast onto the top of a highly reflecting double cone by means of reflectors and condensor lenses, through an opening in the wall of a semi-spherical ball provided with a white wall. The highly reflecting double cone is centrically mounted. The luminous beam leaves the diffused reflecting wall through an exit aperture which is closed by a diffusion disk. The luminous beam which comes from the light source is thus cast onto the the strip reflector without first crossing the reflection path of the reflector, which is turned away from the luminous beam which lights the negative support.

An object of the invention is to arrange the individual elements such as the light source, the strip reflector, and the arched reflector in such a manner that the luminous beam which comes from the light source is cast onto the strip reflector before crossing the reflection path of the arched reflector. In this manner there is a smaller distance between light source and strip reflectors, and also smaller measurements for the arched reflector, for example, an ellipsoidal reflector, because there is a more favorable reflection angle in the strip reflectors.

The steeper light incidence at the strip reflectors is also advantageous for the adjustment path of the cover slides for the strip reflector system. Within the framework of the invention, the aforementioned luminous flux or beam is obtained by maintaining all above advantages in that the luminous beam which exits from the semi-spherical ball is reflected onto the partially covered strip reflectors by an inclined reflector provided in front of the semi-spherical ball. The beam is then directed from the strip reflector onto an arched reflector. From this reflector, the beam is then passed through the diffusion disk onto the negative support, the objective, and finally onto the projection surface. This embodiment also has the advantage that is is possible to place the projection lamp in a vertical position and guide its light horizontally into the above-mentioned diffused reflecting semi-spherical ball. The vertical positioning of the projection lamp enhances the light from the coil filaments in the lamp.

In order to improve the reflection conditions within the reflecting semi-spherical ball, and to obtain a homogenous diffused luminous beam at the diffusion disk, the double conically shaped reflector consists of two cone-shaped reflecting portions which are mounted coaxial with respect to the semi-spherical ball. The base surfaces of these two conically shaped reflecting portions are connected with each other. The walls of these portions are arched inwardly, and end in a small peak. In this way, the small light rays which come from the rear wall of the semi-spherical ball are reflected by the small partial reflector which is positioned in a direction of the exit aperture for the light.

In order to obtain stepped color enlargement with the inventive lighting device, it is suggested in a further embodiment of the invention to provide an adjustable color filter means between the light source and the diffused reflecting semi-spherical ball. In this case, the luminous beam from the light source is directed onto the top of the highly reflecting cone-shaped aluminum reflector by means of reflectors and condensor lenses, concentrically through an aperture within the wall of the white walled semi-spherical ball. In front of the opening, i.e., outside of the semi-spherical ball is the color filter device, which essentially consists of carriers which are moved by pull cables to introduce dichroitic filters having the transmission colors of yellow, purple, and bluish green into the light ray. The filters are positioned in pairs opposite and superimposed with respect to each other. The moveable carriers for the filter disks are moved vertically with respect to the light axis. The filters are positioned so that during the movement of the carriers, a continuous overlapping of the filter disks takes place. The filters are in total overlapped position when the movement of the carriers is stopped. With square-shaped filter disks, this overlapped position is obtained so that the edges of the oppositely arranged filters do not move parallel with respect to each other. This is advantageous, since the adjustment scale which is provided on the adjustment means for each carrier can be calibrated linearly.

In a further embodiment of the invention, a complete linear rotating adjustment can be provided for the color density. This is created by the overlapping of the color filters, and providing a color filter means between the lamp and the opening of the semi-spherical ball device. This filter means may essentially consist of moveable filters which are arranged in pairs opposite to each other, so that the opposite edges of these filters do not run parallel with respect to each other. The pivotable carriers are spring loaded in the direction of movement, i.e., toward each other, and are adjustable to various separated positions by means of a cam disk and a subsequent lever drive.

The circumferential profile of the cam disk, the adjustable movement of the lever drive via a cam roller, and the movement of the filter carriers may be synchronized. On a rotating knob which is mounted on the axis of a cam disk, the linear movement for the increase or decrease of the degree of overlap of the filters results in a linear color density variant. Therefore, the circular adjustment scale of this rotating knob can be linearly divided. The double, conically-shaped aluminum reflector reflects with its cone, which is in the direction of the entrance opening of the semispherical ball, the non-homogeneous light which may be partly colored, depending on the position of the color filters with respect to the white inner wall of the semi-spherical ball. On the white inner wall, the light is homogeneous to a great extent, due to the multiple oscillating reflection, before it exits through the diffusion disk at the opening exit or outlet of the semi-spherical ball, or, is reflected via the other cone of the aluminum reflector onto the diffusion disk.

The inventive lighting arrangement with its associated strip-like reflector is particularly safe and easy to handle in that the shafts for the slides are guided in two opposite, parallel walls. Between the walls, a plate is provided moveably parallel with respect to these walls, and is spring supported. The bores or holes in the plate are provided with an elastic lining which can be selectively adjusted to two operating positions by means of an eccentric so that in one position, the displacement of the shafts can be carried out freely, while in the other operating position, the shafts are held in a fixed position by the elastic lining since the lining exerts a one sided pressure on the shafts. Therefore, it is possible to hold the shafts for the slides in one adjusted position with one simple manipulation, and very simple constructional elements, and to expose a plurality of enlarged positives from the same negative, in series, on the projection surface, in the desired diffused light intensity.

Since it is desirable, in accordance with the invention, to place the shafts of all slides into a new starting position before lighting a new negative, i.e., into a position where all slides have been completely retracted and the strip reflectors are completely exposed to the luminous beam, a retracting plate for the shafts is provided at the outer service wall. The plate is freely displaceable in operating direction of the shafts. The retracting plate is provided with a corresponding number of apertures which engage the shafts. The diamter of these apertures is larger than the diameter of the shafts so that no engagement takes place between the shafts and the apertures in the plate. Hence, the apertured retracting plate, which is loosely guided on a guide bar, can now be retracted from the outer wall of the lighting attachment, so as to retract all of the shafts into their starting position. For this purpose, the shafts are provided with heads having a diameter which is substantially larger than the diameter of the apertures in the retractor plate. The apertured retractor plate can thus be immediately returned to its operating position at the outer wall of the strip reflection system.

Within the frame work of the invention, and to simplify the actuation of the apertured retractor plate, a spring system is provided between the plate and the outer wall of the strip-like reflector system where the retractor plate is returned to the latter mentioned operating position.

In a further embodiment of the invention, a continuous layer of an elastic material is provided on the inner wall which support the shafts for the slides. This elastic material with its associated bores or holes engage the shafts tightly so that the supporting friction is increased to prevent an unintentional displacement of the shafts.

The total strip reflection system of the lighting attachment may also be used for other devices, such as copying devices. This improvement is possible if all strip reflectors are provided with even upper and lower limiting edges, and are parallel with respect to each other in their horizontal position. This arrangement of the strip reflectors permits them to keep their slots closer together between the individual strip reflectors, so that the degree of reflection of the total strip reflector surface is increased. A further advantage of this arrangement for the strip reflector is that all openings for the support of the shafts for the slides are spaced the same distance from each other, and can be provided in parallel rows. This naturally simplifies the adjustments of the slides. The area in which all of the shafts are arranged corresponds substantially to a trapezoid.

Because of the very small slots between the individual strip reflectors, it is not possible to arrange the slides so that they may overlap. If two slides did overlap, no light could penetrate between two adjacent slides. Because of the close distance of the subject slides, some light always penetrates through two adjacent slides. Therefore, within the frame work of the invention, the slides are arranged in stacked rows, i.e., one of the adjacent slides covers the slot between two slides of the adjacent lower row.

In a further embodiment of the invention, the upper surface of the reflectors is silver plated in order to reduce the loss of light between the individual reflectors to a low level. In this case, no disturbing refraction of light can occur at the edges of the glass.

The assembly of the strip reflector system together with the associated slides is simplified in accordance with the subject invention, in that the rear edges of the strip reflector are beveled so that each slot between two adjacent strip reflectors runs into a wider groove with inclined walls into which slide is mounted. Each slide thus glides by itself into the slot between the adjacent strip reflectors.

The slides should have a small width for easy handling, so as to permit a fine stepped partial covering; the shafts accordingly are very closely spaced with respect to each other. Therefore, in accordance with another embodiment of the invention, a device is provided which essentially consists of a jacket which is open at its front end, and provided with a displaceable permanent magnet.

The permanent magnet is held in a retracted position by a pre-tensioned, outwardly arching flat coil spring, which is accessible from the outside. By simply pressing on the flat coil spring, the spring extends and slides the permanent magnet forward so that it extends somewhat outside of the front opening of the jacket. In this position, each given slide can be engaged by the permanent magnet and pulled outwardly. On the other hand, if the shaft of a slide is to be inserted into the device, the permanent magnet should be placed on the head of the desired slide, and move the shaft into the desired depth. Thereafter, the coil spring should be released so that the permanent magnet can be retracted back into the jacket. In this position of the permanent magnet, the magnet does not exert its magnetic force on the head of the corresponding slide, and the device can be removed without changing the desired position of the corresponding slide.

In a further embodiment of the invention, a special device is provided wherein a given desired operating position of the total field of the shafts for the slides can be obtained, i.e., in which a given number of slides extend more or less from the slots between the partial reflectors and which exclude a desired number from the reflection so that the device can automatically reproduce all desired positions. This device, in accordance with the invention, consists essentially of a U-shaped frame, wherein a box plate is held in suspension midway within the frame by means of springs. The box plate is provided with support bores or openings flush with the walls which correspond to the exact location of the bores which support the shafts for the slides. The support bores in the box plate are provided with freely displaceable plungers, the diameters of which correspond to the diameters of the shafts. The plungers may be selectively held in a fixed position by a plate which is positioned between the walls of the box plate, or may be released. The plate for either fixing or releasing the plungers corresponds in function and construction to the plate which has been described in the strip reflector system.

The reproductive storage of the given desired operating positions of the shafts for the slides is carried out in the following manner:

First of all, the shafts for the slides are fixed in their desired operating position by a lateral displacement of the above-mentioned plate, the openings of which are lined with an elastic material.

The lateral displacement of the plate can be performed by means of a cam lever. After all the shafts have been fixed in their desired operating positions, the invention device for automatically storing this position is moved to the shafts, so that each plunger engages the head of the corresponding shaft. All plungers are in their relieved position, so that they can be displaced more or less during the movement of the device, until all of them resume their relative length with respect to each other, corresponding to the position of the shafts. Thereafter, the plungers of the device are fixed in their position by the aforementioned plate. The device can then be removed for the reproduction of a new operating position of the shafts. Thereafter, other desired slide positions may be undertaken on the lighting attachment. If the previously stored operating position of the slides of the lighting attachment are to be reproduced, the free, displaceable apertured plate is pulled to the forward position until all shafts, which naturally were relieved by the plate from their fixed position, assume the utmost retracted position. Thereafter, the device for the reproduceable storage is returned back to the field of the shafts, and the shafts are pushed back into the original operating position by the plungers. The inventive lighting attachment is then ready for the next enlarging operation.

Other objects and features of the present invention will become apparent from the following detailed description when taken in connection with the accompanying drawings which disclose the embodiments of the invention. It is to be understood that the drawings are designed for the purpose of illustration only, and are not intended as a definition of the limits and scope of the invention disclosed therein.

In the drawings, wherein similar reference numerals denote similar elements throughout the several views.

Figure 1:
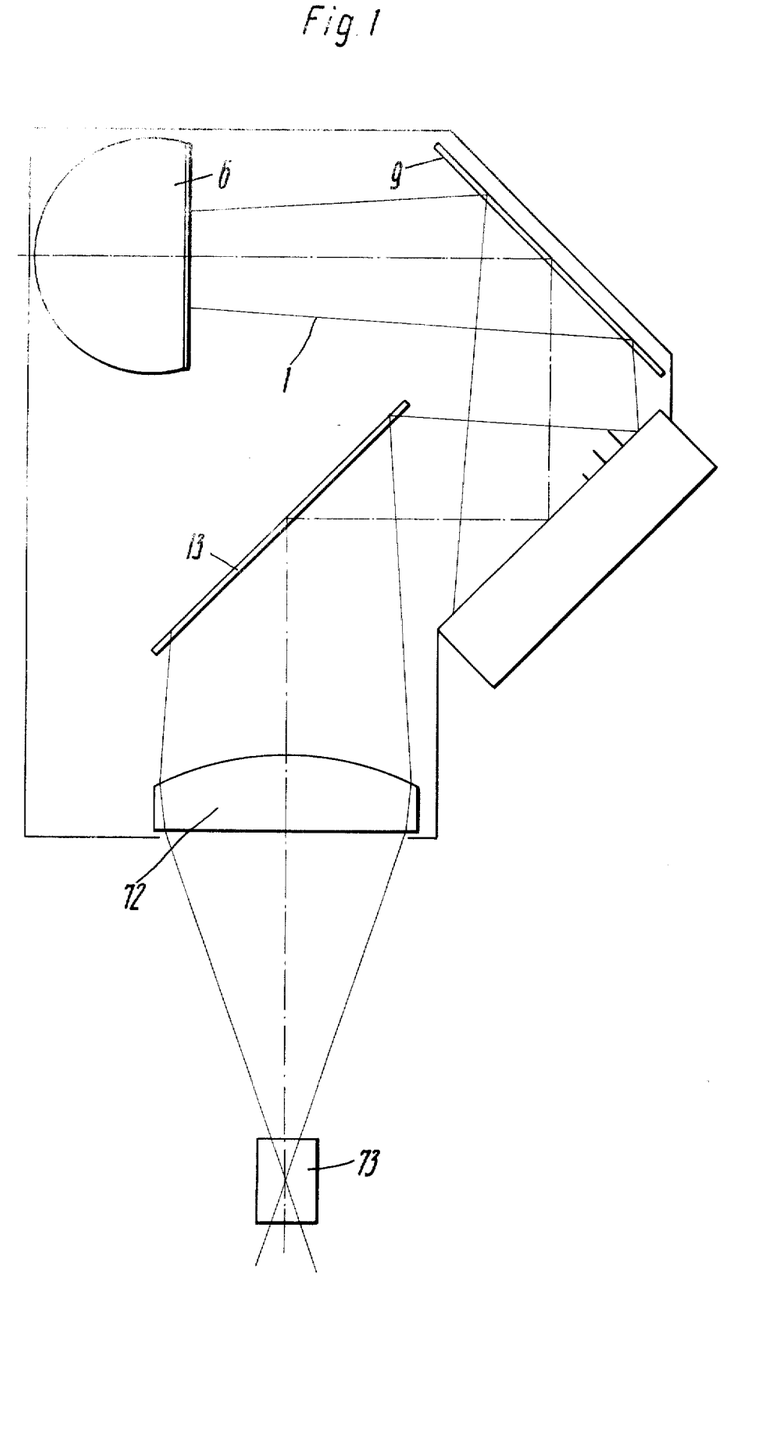
FIG. 1 is a schematic drawing of the necessary elements for the luminous beam of the inventive lighting attachment.
Figure 2:
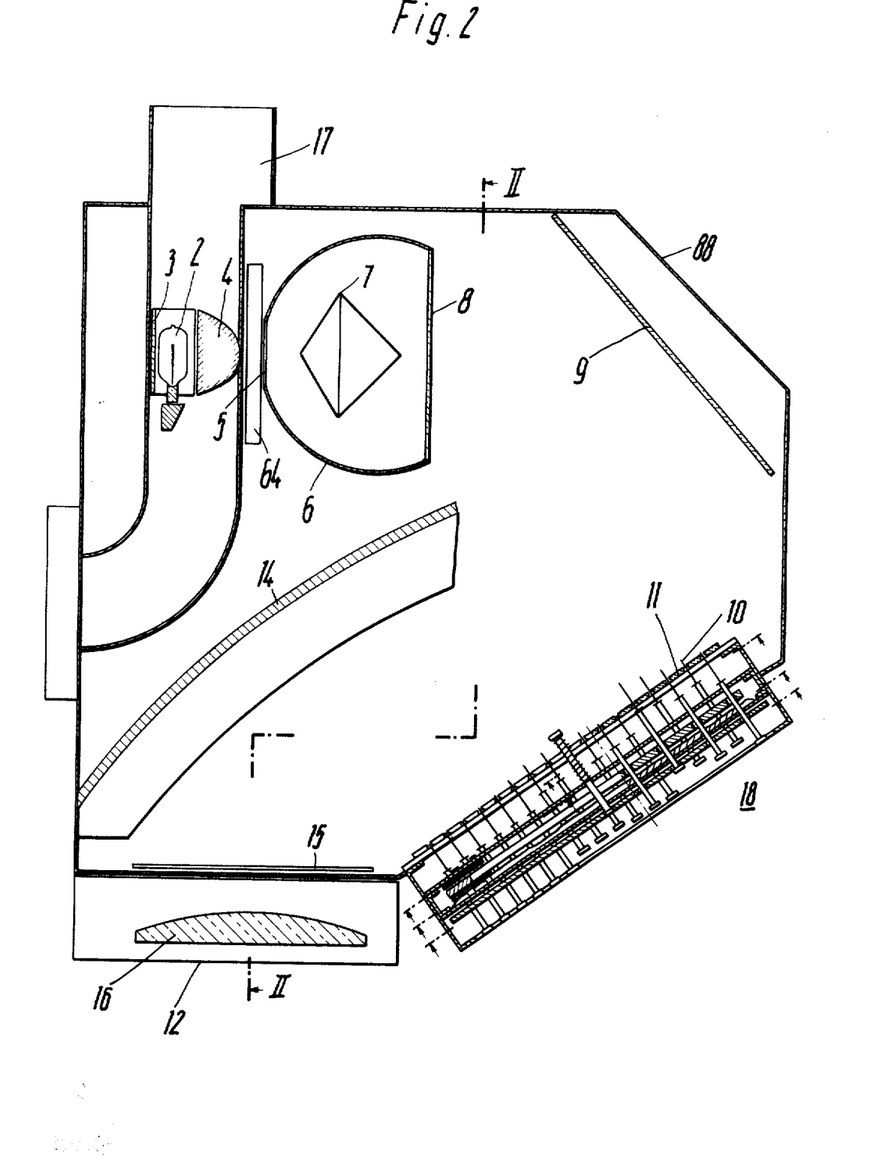
FIG. 2 is a cross-sectional view taken along lines I—I of FIG. 3, of another lighting attachment.

Referring to FIGS. 1 and 2, the luminous flux or beam 1 of lamp 2 is cast onto a high reflecting double cone 7 by means of reflectors 3, and condensor lens 4, concentrically through aperture 5 of wall device 6. Wall device 6 is arched semi-spherical and whitened at its inner side.

A color filtering means 64 (see FIG. 12) is provided between condensor lens 4, and opening 5, and includes carriers 68 and 69 which are moved by pull cables in guides 66 and 67 which introduce pairs of counter, and superimposed travelling dichroitic filters having transmission colors yellow, purple, and bluish green into the path of the beam.

The reflecting double cone 7, is made of highly reflective material, such as aluminum, and reflects the non-homogenous light, which may be colored according to the position of the filters. This light is reflected around the white inner surface of semi-spherical ball 6, so that due to the multiple, oscillating reflection, the light becomes homogenized before part of it exits through the white inner surface of ball 6, directly through diffusion disk 8 which is fed by the left portion of double cone 7, as shown in FIG. 2, or is reflected via the right portion of double cone 7 through diffusion disk 8. The optimum homogenized light which penetrates diffusion disk 8 is cast onto reflector 9, and is then reflected, in known manner, by means of slides 10 and partially covered strip reflectors 11. Slides 10 can be advanced or retracted from the path of the light ray, so that they block their associated regions from reflection. Thus, it is possible to darken luminous beam 1 at least partially, in order to obtain the desired partial and stepless variation of the light density on the negative support surface 12. In the embodiment shown in FIG. 1, the luminous beam which has an intensity partially changed by strip reflectors 11, is reflected to an inclinded flat surface reflector 13, form which it is cast onto the projection surface (not shown) through condensor lens 72 into objective 73.

In the embodiment of FIG. 2, the luminous beam reflected by strip reflectors 11 is cast onto an ellipsoidal reflector 14, and is then cast through diffusion disk 15, a subsequent correction lens 16, negative support 12, and objective 73 (see FIG. 1), onto the projection surface.

Figure 3:
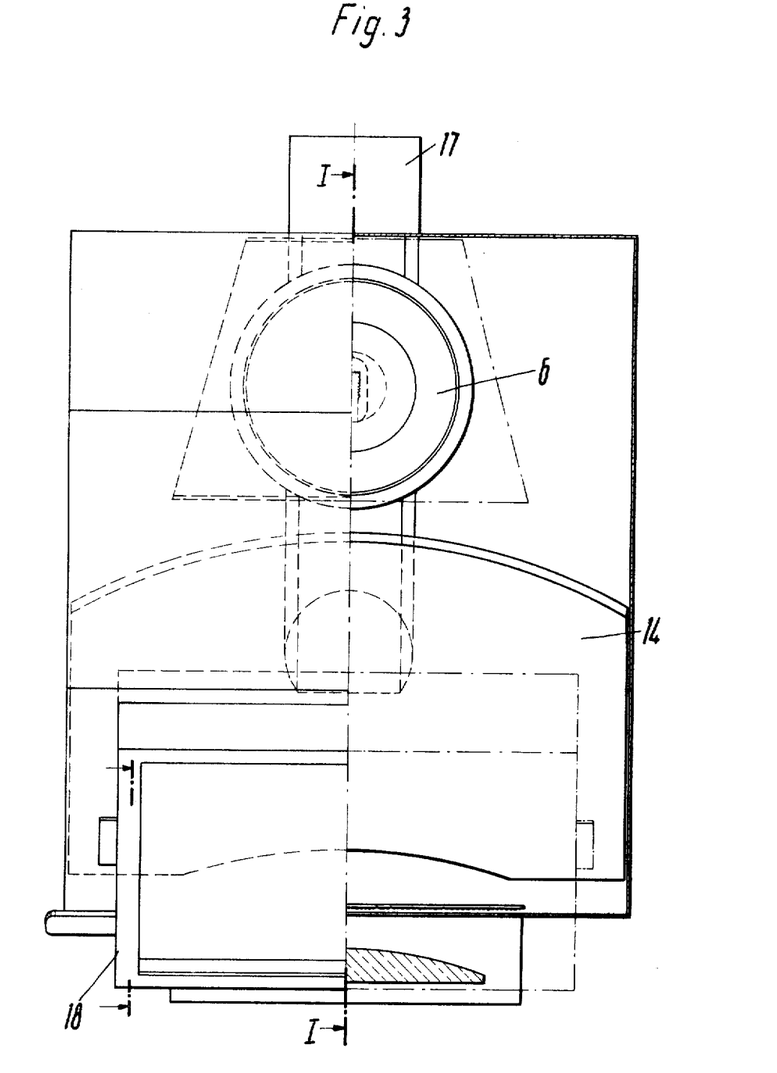
FIG. 3 is a cross-sectional view through the lighting attachment of FIG. 2 taken along cross-sectional line II—II of FIG. 2, whereby the left half of the view of FIG. 3 shows the front view of the inventive lighting attachment and only the right side of FIG. 3 shows the above-mentioned cross section.

In FIG. 3, the most important constructional elements of the lighting attachment are shown in a front view, as well as a section taken along line II—II of FIG. 2. In the upper portion, the open semi-spherical ball wall 6 can be seen whereby diffusion disk 8, which closes the front opening, has been omitted. Double cone 7 is centrally mounted within wall 6. Lamp 2 is mounted within ventilating pipe 17. Ellipsoidal reflector 14 is mounted opposite of strip reflector means 18, which is described in more detail in FIG. 4 and 5.

Figures 4, 5:
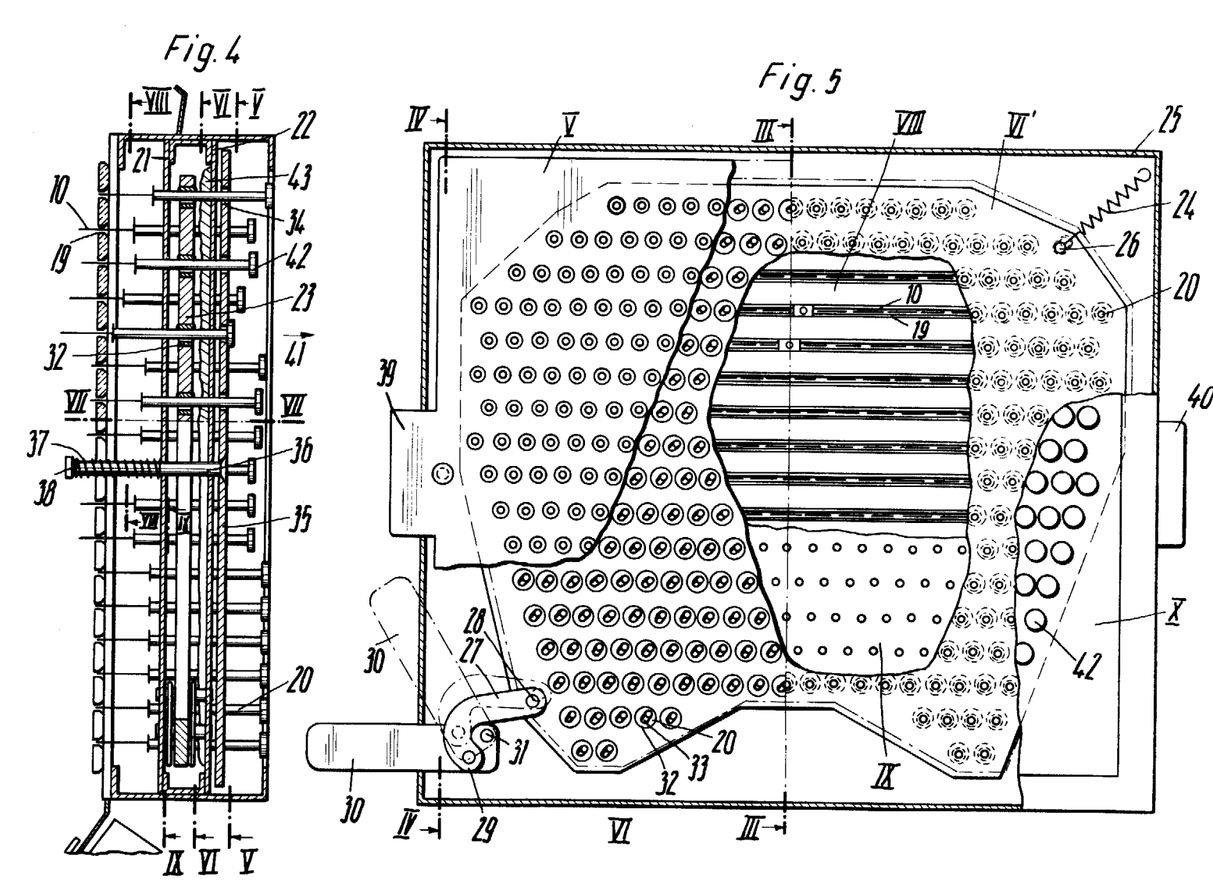
FIG. 4 is a stepped sectional view of the actuating device for the inventive strip reflector system, whereby the upper section of FIG. 4 is cut along lines III—III, the lower section along line IV—IV of FIG. 5, and the border between the two sections is shown by the dash-dot line VII—VII.
FIG. 5 is a partial front surface view of the actuating device according to FIG. 4 whereby only the right lower field of FIG. 5 reflects a partial view while the V designated field indicates a section taken along line V—V of FIG. 4, the area designated as VI shows a section taken along line VI—VI, the area VI' shows a section taken along line VI—VI, except for the arrested position of the device, the area designated as VIII is a section taken along line VIII—VIII, and finally the area designated with IX shows a section taken along lines IX—IX.

FIGS. 4 and 5 shows details of the construction of strip reflector means 18. According to the sectional view of FIG. 4, slides 10 engage slots 19 between strip reflectors 11. Slots 19 are relieved with respect to the reflection surface of slide 10. Shafts 20 of slide 10 are guided in two fixed, parallel and opposite walls 21 and 22. Between walls 21 and 22 is a displaceable parallel plate 23 supported by springs. The support of plate 23 can be seen in FIG. 5. In this drawing, a tension spring 24 is mounted in the upper right portion of housing 25 for strip reflector means 18, the opposite end of which engages plate 23 via pin 26. On the opposite side of the plate, i.e., on the lower left portion of FIG. 5, a bell crank 27 engages plate 23 by means of a hinge bolt 28. Bell crank 27 is connected with adjusting lever 30 by hinge bolt 29 which is pivotable around bearing bolt 31. As can be seen from FIG. 4, the holes of plate 23 through which shafts 20 of slides 10 extend are larger than the shaft diameters and are additionally provided with an elastic lining 32.

By means of the drive which consists of adjusting lever 30 and bell crank 27, plate 23 can be selectively displaced into two limit positions. In the first position, shafts 20 are centrally mounted within the elastic lining 32 (see FIG. 5 area VI'). In the second position, elastic lining 32 is pressed against shafts 20, so as to prevent an unintentional displacement of the shafts. This latter mentioned position is also shown in FIG. 5. Designated section VI of the slide area which corresponds to section VI—VI of FIG. 4, shows that plate 23 is displaced in such a manner that shafts 20 assume an eccentric position within holes of plate 23, and are therefore subjected to lateral engaging forces by elastic lining 32. In this position of plate 23, it is impossible to displace shafts 20.

The designated section V is a section taken along line V—V of FIG. 4 and shows that shafts 20 engage retractor plate 35 centrally through the larger holes 34, whereby retractor plate 35 is located in front of the outer stationary wall 22. Retractor plate 35 is mounted on guide bolt 36 which is supported by means of a pressure spring 37 on stationary wall 21. Pressure spring 37 is thus retained by head 38 of guide bolt 36 and presses retractor plate 35 into the position shown in FIG. 4.

On the right and left side of retractor plate 35, projections 39 and 40 are provided which engage retractor plate 35 and displace the plate in the direction of arrow 41 until all of the shafts are retracted into their starting position by means of their circular heads 42, which in this embodiment are shown by the lower six shafts 20. Slides 10 of these six shafts are all withdrawn behind the reflection plane of strip reflectors 11. This is the starting position of the strip reflector means from which the operator can now push individual shafts 20, or entire groups of shafts 20 into the opposite direction of arrow 41, in order to cover certain strip reflector zones against penetration of light from the projection lamp. Therefore, the negative which is mounted on negative support surface 12 can be lighted locally with different degrees of light.

On the inside of wall 22, a lining 43 is provided which consists of a soft elastic material which offers a certain displacement resistance to shafts 20 in their relieved position so that they can maintain a certain preselected position after they are set, so long as no other additional forces are exerted on them after plate 23 has released shafts 20.

The section indicated with VIII of FIG. 5 is a sectional view taken along lines VIII—VIII of FIG. 4, which shows the position of slides 10 with slots 19 between strip reflectors 11. Sectional view X of FIG. 5 is a front view of the strip reflector means 18. While plate 23 of the sectional view VI of FIG. 5 as mentioned before, fixes shafts 20, so that they withstand a certain axial pressure, without changing their position, plate 23 is displaced into the right upper position when adjusting lever 30 is pivoted into its dash-dot designated position with the assistance of the tension spring 24, so that the bores 33 of the plate centrally encompasses shafts 20. The shafts can then be adjusted manually for adjusting slides 10 (see sectional view VI of FIG. 5).

Figure 6:
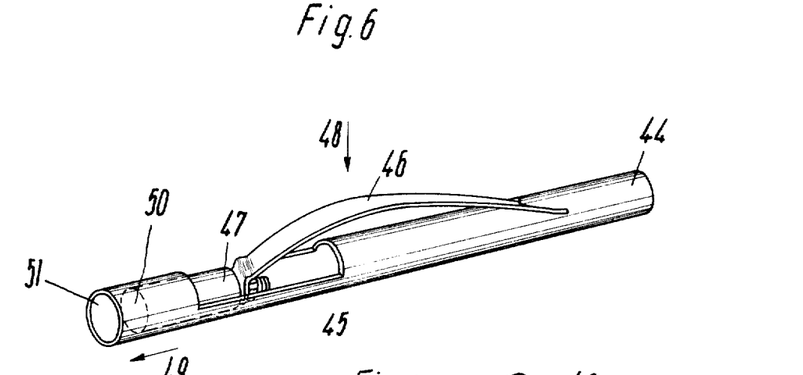
FIG. 6 is a perspective view of an inventive device for actuating the slide.
Figure 7:
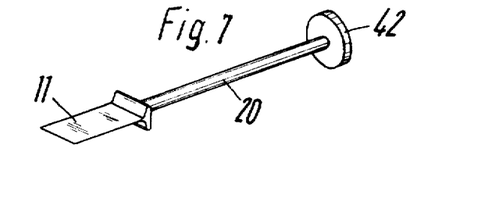
FIG. 7 is a detail perspective view of a shaft used in FIG. 4.
Figure 8:
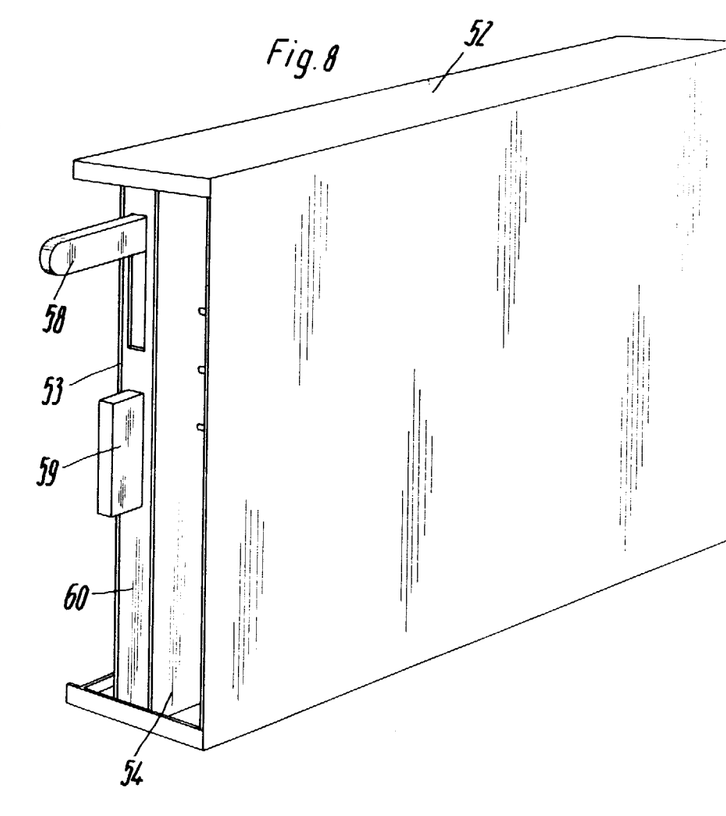
FIG. 8 is a perspective view of an inventive device for storing reproducibly, the different operating positions of all of the slides.
Figure 9:
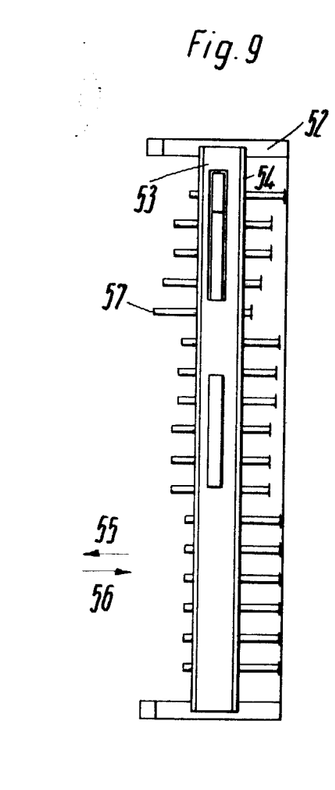
FIG. 9 is a side view of the device of FIG. 8.

FIG. 6 shows a very simple and easy to use actuating device for slides 10, together with their associated shafts 20. FIG. 7 shows the individual perspective view of one slide 11, one shaft 20 and head 42. The actuating device according to FIG. 6 essentially consists of a cylindrical non-magnetic tube 44 having a cutout 45 which is engaged by one end of an arched band coil spring 46, while the other end is anchored in an oblique cut of tube 44. The end of band coil spring 46, which engages cutout 45 is connected with a cylindrical bar magnet 47, which is freely moveable in the front section of tube 44. When the actuating device is manually pressed, band coil spring 46 moves in the direction of arrow 48, so as to be flattened, and displace the bar magnet in the direction of arrow 49. Thus, the front surface 50 extends from front face opening 51. Therefore, the actuating device can be held to a given head 42 of shaft 20 of a slide 10, and since head 42 is made of iron, a magnetic pulling force can be exerted on the head by magnet 47. The inner diameter of tube 44 should not be larger than the diameter of a head 42, so that head 42 is prevented from entering tube 44. When slide 10 has been brought into the desired position, in this manner, band spring coil 46 may be released, so that bar magnet 47 is released from head 42 and moves backwardly. Therefore, slide 10 remains in a desired fixed position.

The inventive actuating device thus permits shafts 20 to be arranged for slides 10 in rather close position, since each individual head 42 can be engaged with the actuating device, without accidentally displacing one of the adjacent heads 42.

In order to exactly repeat a former optimum correction of a negative by means of partly covered strip reflector 11 by slide 10, a storage plate is provided which is constructed similar to housing 25 together with associated shafts 20. Construction and operation of this storage plate are explained in FIGS. 8–11.

In FIGS. 8–11, the two fixedly connected apertured plates 53 and 54 within box 52 are displaceably mounted in the direction of arrows 55 and 56. Between these plates is an arresting plate (not shown) which is similar to plate 23 of strip reflector means 18. The amount, size and arrangement of slide 57 are identical with the ones of shafts 20 of strip reflector means 18. After the arresting plate is released, slides 57 can be displaced with a light pressure. However, if actuating lever 58 is pulled downwardly, all of slides 57 are arrested. By means of shoulders 59 (mounted on the left connecting wall 60, of FIG. 8 and also present on the right connecting wall which is not shown in this view for both apertured plates 53 and 54) the storage plate 53–60 can be conveniently engaged and displaced. This storage plate extends from apertured plate 53 and 54.

Figure 10:
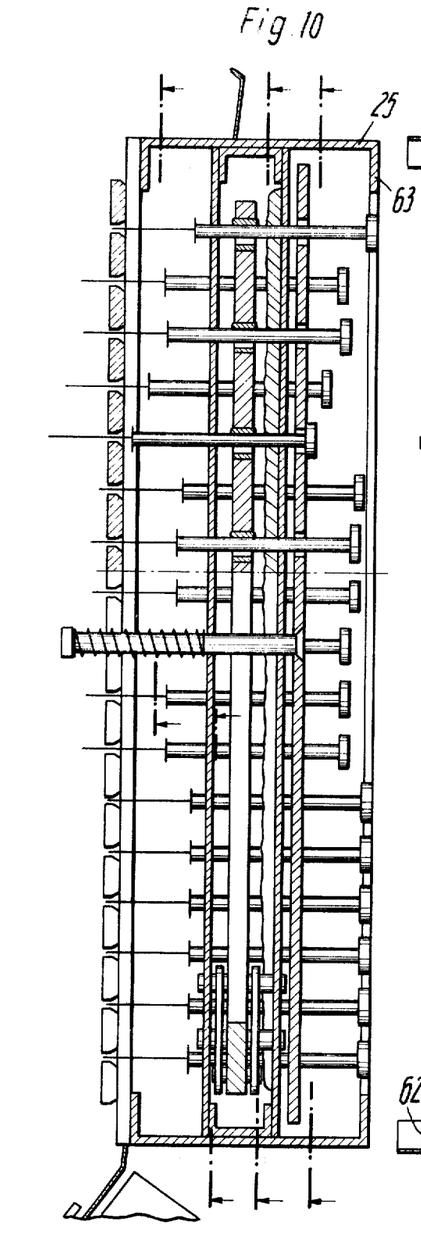
FIG. 10 is an enlarged view of FIG. 4.
Figure 11:
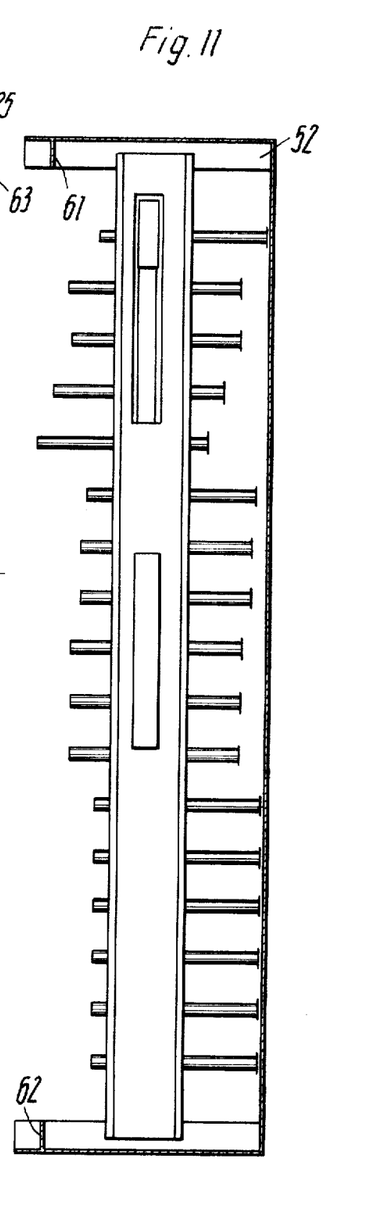
FIG. 11 is an enlarged view of FIG. 9, whereby the actuating device for the slide according to FIG. 10, and the device for storing reproducibility of the operating positions according to FIG. 8 are so arranged that the positions of the shafts of the actuating device according to FIG. 10 may be set in the position shown.

If, for example, one wishes to reproduce the position of shafts 20 shown in FIG. 10 for a later lighting of the associated slides 10 for the negatives, shafts 20 are moved from the dash-dot position of adjusting lever 30 (see FIG. 5) into a fully extended position and the displacement of plate 23 is fixed in the present location. Thereafter, box 52 together with storage plate 53–60 is brought into the front of the area of shafts 20, so that heads 42 are flush with slides 57, so that a slide 57 is provided with a corresponding head 42. All slides are initially extended forward as much as the construction permits. For this purpose, storage plate 53–60 is pushed rearwardly as much as possible until all slides 57 engage the rear wall of box 52. In this position all slides 57 are not arrested and easily displaceable. Thereafter, storage plate 53–60 is moved forwardly until the front apertured plate 53 engages front surface bars 61 and 62. At this point, slides 57 are arrested by pulling on actuating lever 58, and their front surfaces assume a position which is a duplicate of the position assumed by the front surfaces of heads 42.

If at a later point in time the stored operating position is to be reproduced, after shafts 20 were used in other different operating positions, all of shafts 20 are completely retracted into a starting position by retractor plate 35, corresponding to the position of the lower six shafts 20 in FIG. 10, which naturally were released by a corresponding adjustment of plate 23.

Thereafter, box 52 with its associated front portion is slid onto housing 25, until its front surface bars 61 and 62 engage the front surface 63 of housing 25. Subsequently, storage plate 53–60 are engaged on shoulders 59 and displaced into the utmost outer front position, so that heads 42 of shafts 20 are contacted by slides 57 and brought into the desired position. At this point, box 52 can be removed. The strip reflector means 18 is now in the reproduced operating position for lighting the first used negative.

Figure 12:
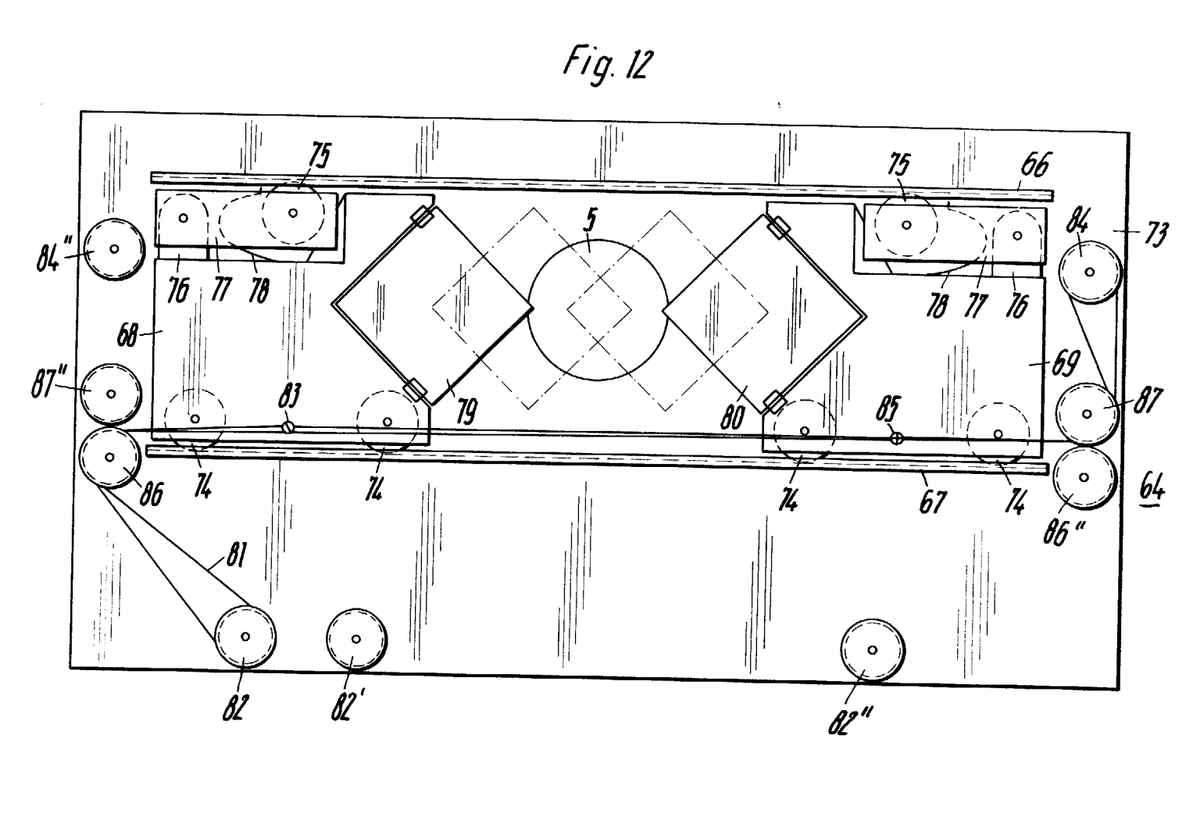
FIG. 12 is a front view of a color filter means.

The color filter means 64 of FIG. 12 consists essentially of a carrier plate 73 on which guides 66 and 67 are mounted. In these rail like guides 66 and 67 are moveably mounted carriers 68 and 69 on rollers 74 and 75. The upper rollers 75 are elastically pushed into the upper guide 66, in order to assure a complete freedom from play for carriers 68 and 69. For this purpose, each carrier 68 and 69 is provided with a shoulder 76, on which a roller carrier 77 is pivotably mounted. In roller carrier 77, an upper roller 75 is mounted and a spring engages roller carrier 77 in order to push the carrier upwardly, so that the upper rollers 75 always engage upper guide 66 under the influence of spring 78.

Filter 79 and 80 are mounted on each carrier 68 and 69 which are completely identical. In the shown embodiment, filters 79 and 80 have a square shape and are mounted in the angularly shaped cutouts of carriers 68 and 69. One corner of the filters extends forwardly so that the corresponding diagonals of square-shaped filters 79 and 80 are flush with each other. This arrangement is particularly important since it is possible to have a linear displacement of carriers 68 and 69, and also a coupled linear change of the degree of color mixing of the color filter means 64. In FIG. 12, two subsequent positions of filters 79 and 80 are shown, whereby filters 79 and 80 are shown in a complete extended position, and in a retracted position by the dash-dot lines. In the dash-dot position, filters 79 and 80 overlap in a square, partial region, and this partly overlapping region grows continuously by the continuous movement of carriers 68 and 69. As can be seen from the drawing, the overlapping region of filters 79 and 80 is always exactly centered in front of opening 5 through which the light enters the semi-spherical wall 6. Furthermore, a complete homogenous light mixture is assured within this semi-spherical wall 6.

The adjustable movement for filters 79 and 80 is effected by means of the endless cable lines 81. This pull cable is wound around drive roller 82, and is connected with one strand to carrier 68 by a screw 83. The other strand is connected to carrier 69 by means of return pulley 84 and screw 85. Because of the counter movement of the strands, return pulleys 86 and 87 are arranged in pairs parallel with respect to each other.

Further drive rollers 82' and 82'' are mounted on the carrier plate 73, which drive a further pair of filters parallel to the carriers 68 and 69 which are located either are in front of or behind the carriers, depending on the view. Drive roller 82' cooperates with return pulleys and associated pull cables, (not shown), which in the shown embodiment would be behind return pulleys 86, 87 and 84, and would act in the same manner, while a third drive system for a third pair of filters consists of drive roller 82'' and the return pulleys 86'', 87'' and 84''.

In a further embodiment of the invention, the box like portion containing negative support 12 can be used for enlargement devices which may be used for a plurality of negative formats, in that, the distance between the exit opening of housing 88 of the lighting attachment and the negative support 12 can be increased or decreased by a stable mechanical drive. The side walls of this box-like portion must be replaced in this case by a yoke (not shown).

Figure 13:
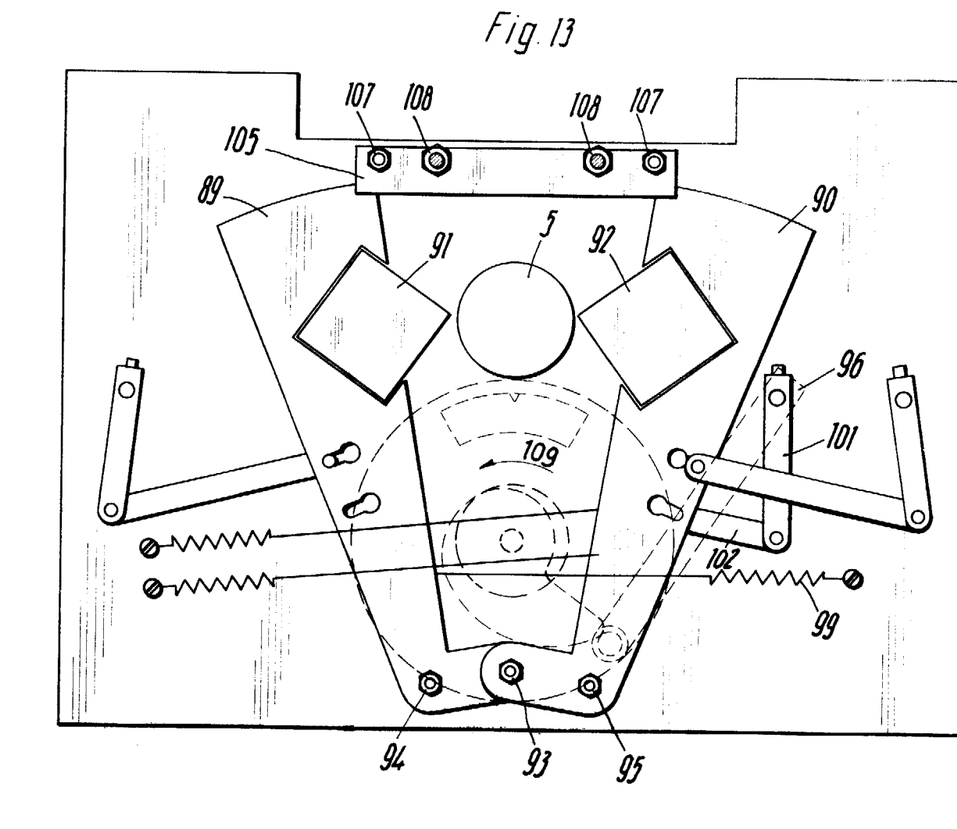
FIG. 13 is a rear view of another embodiment of the color filter means.
Figure 14:
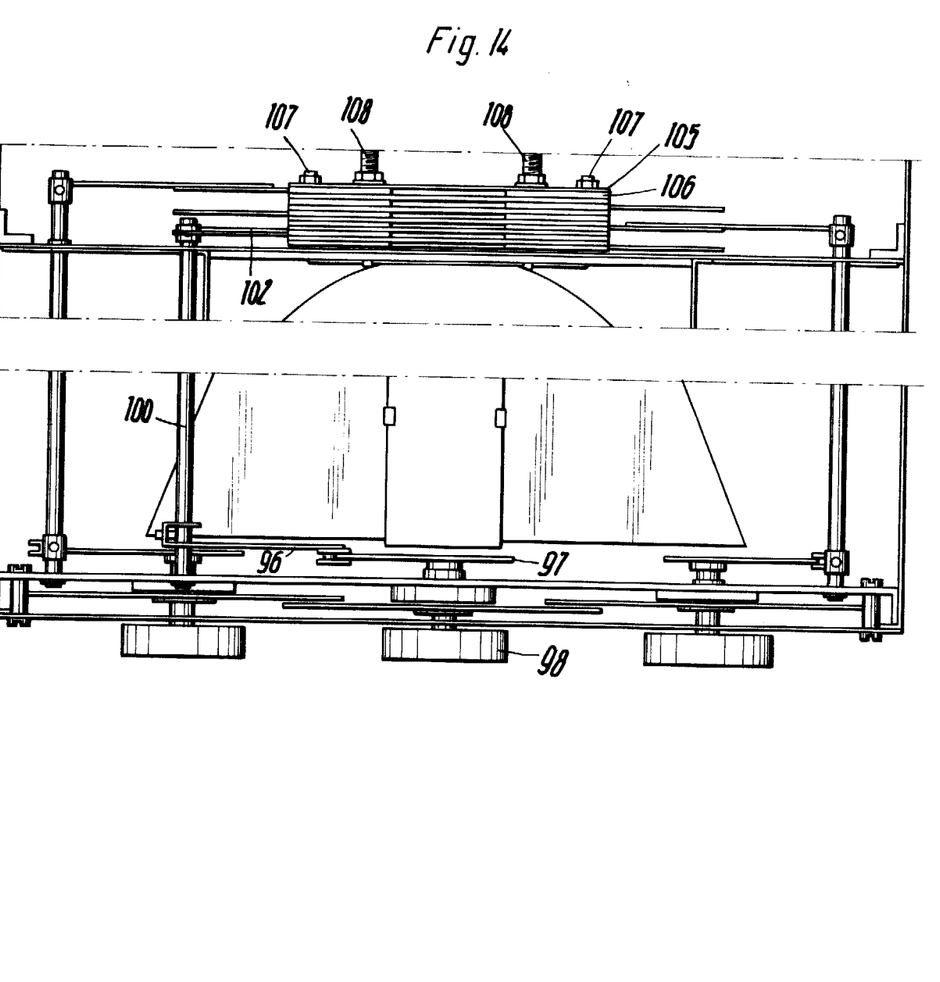
FIG. 14 is a plane view of the color filter means according to FIG. 13.
Figure 15:
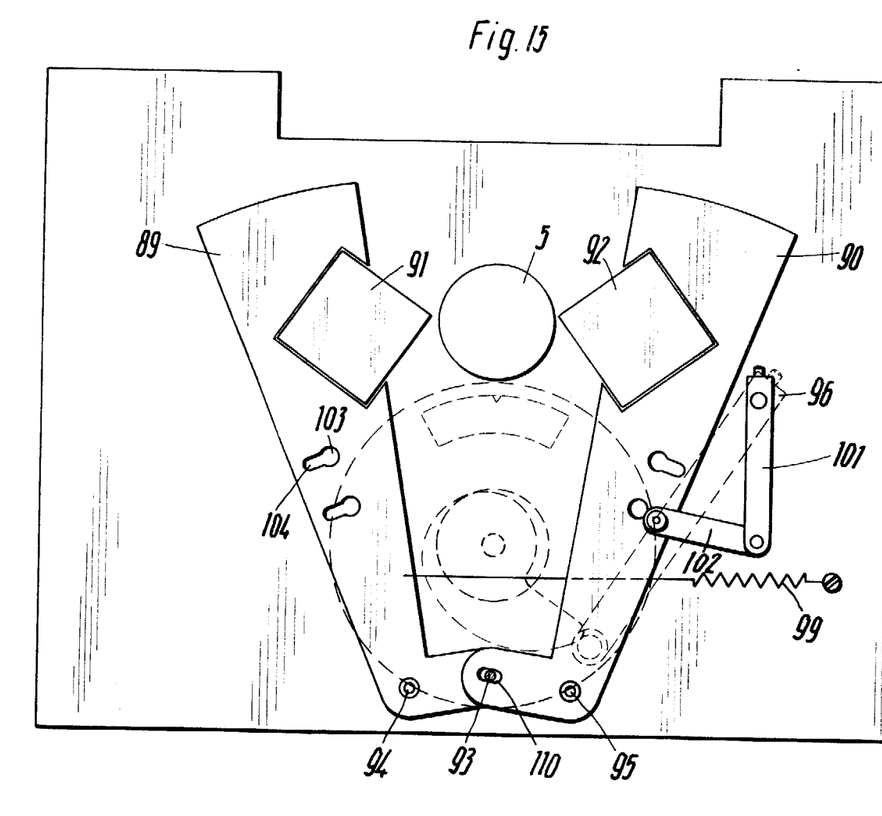
FIG. 15 is a rear view of the filter means according to FIG. 13, whereby only one pair of filters is shown with its associated drive.
Figure 16:
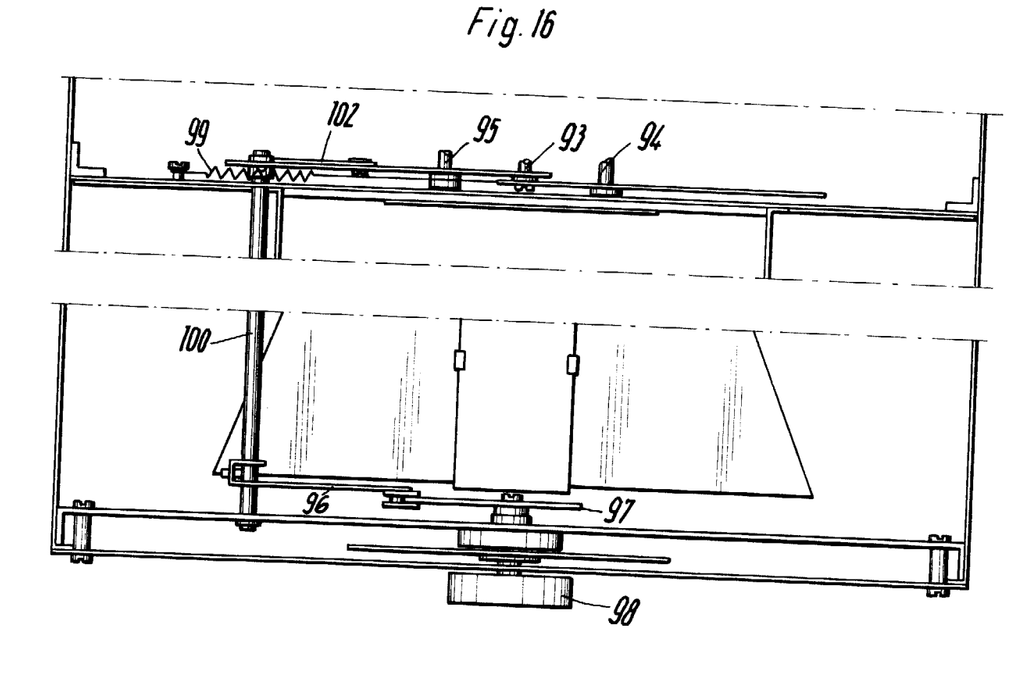
FIG. 16 is a plane view of the color filter means of FIG. 15.

Thereby, a smaller negative would enter into a deeper and smaller portion of the converging rays, since the total light beam of the lighting attachment goes through the negative, so that slides 10 could also influence the lighting. Therefore, this part can be used as an universal adapter for the different size enlargement types. In FIGS. 13 to 16, a particularly advantageous color filter means is shown whereby FIGS. 13 and 14 show total filter pairs 91 and 92 which are arranged in series on carriers 89 and 90, 89' and 90' as well as 89'' and 90'' with their associated drives. FIGS. 15 and 16 show only the back carrier pair 89 and 90 with their associated drives, seen from the operating side.

The carriers 89 and 90 for the two color filters 91 and 92 (there are a total of three pairs of such carriers 89 and 90, 89' and 90' as well as 89'' and 90'' together with their associated filters 91 and 92, all mounted in series with respect to each other) are formed with bell crank levers and are connected with each other through their lower shanks by means of a hinge bolt 93. Carrier pairs 89', 90', 89'' and 90'' are not shown in order to simplify the drawings. The lower shank of the rear carrier 89 (the carriers 89 and 90 as well as the remainder of the carrier pairs 89', 90' and 89'', 90'' are arranged in adjacent pivot planes) contains according to FIG. 13 a longitudinal slot (not shown) which is engaged by hinge bolt 93, so that in the joint, two degrees of freedom exist. This is necessary in order to assure the free movement of hinge bolt 93, which carries out a circular pivot movement with respect to the lower shanks of carrier 89. Carrier 89 is pivoted on an opposite arched circle. According to FIG. 15, longitudinal aperture 110 is provided in the lower shank of front carrier 90. The pivot bearings 94 and 95 for carriers 89 and 90 are stationary. With respect to FIGS. 13 to 16 it will be sufficient to describe only the lever drive for the right carrier 90. It should be noted that carrier 90 is actually hidden by carriers 90' and 90'' in FIG. 13 (therefore see FIG. 14). Therefore, cam lever 96 is indicated by dash lines. In FIGS. 15 and 16, carrier pairs 89', 90' and 89'', 90'' were omitted, so that the following explanation is preferably directed to FIGS. 15 and 16. Cam lever 96 is pivoted by means of cam disk 98, which in turn, can be adjusted in both turning directions by rotating knob 98. Carrier 90 and all subsequently described drive parts which are all under the return force of spring 99, are also pivoted by cam disk 98. The pivot of curve lever 96 is transmitted onto shaft 100 and from there onto oscillating lever 101 which is fixedly connected with shaft 100, whereby the oscillating lever articulatedly engages pull rod 102. Pull rod 102 carries a mushroom like shoulder (not shown) at the end which is adjacent to carrier 90 which is extended through bore 103 when the device is assembled. Thereafter this shoulder is guided into guide slot 104 which runs into bore 103. On the end of guide slot 104 which is away from bore 103, the shoulder of pull rod 102 is engaged under constant tension since spring 99 constantly loads carrier 90 in this engagement direction.

The upper end of carrier 90 is guided in a track which is formed in metal which will be more closely described as follows: According to FIG. 14, this metal portion for the tracks to guide the carriers 89 and 90 as well as the remainder of the carriers 89', 89'' and 90' 90'', consists essentially of the seven guide rails 105 and the intermediary six distance spacers 106. Distance spacers 106 are shorter than guide rails 105, as can be seen from the dashed indication of distance spacer 106 in FIG. 13. The total metal portion 105 and 106 is held together by holding screws 108 on housing 88 (see FIG. 2).

FIGS. 13 and 14 show carriers 89 and 90, and therefore filters 91 and 92 in their most separated position, wherein filters 91 and 92 do not overlap. When cam disk 97 is turned in direction of arrow 109, color filters 91 and 92 move toward each other and initially, partially cover opening 5, through which the light enters. At a later movement, the filters finally overlap and create an increased color intensity.

While only a few embodiments of the present invention have been shown and described, it will be obvious to those skilled in the art that many changes and modifications may be made thereunto without departing from the spirit and scope of the invention.

What is claimed is:

1. A lighting attachment for photographic enlarging devices for enlarging negatives comprising:
    a light source for projecting an illuminated beam;
    a semi-spherical hollow ball having a white internal wall surface with an input opening on its curved surface directed at said light source, and a light output opening disposed on the open flat portion of the ball opposite said input opening, said openings defining the optical axis of the ball;
    a highly reflective double cone centrally disposed within said hollow ball and consisting of two cones having common bases with their vertexes defining an axis that is coaxial with the optical axis of said ball, wherein one cone reflects light from said light source onto the internal wall surface of said ball, and the other cone reflects light from the wall surface to the output opening;
    a diffusion disk closing the output opening of the ball for diffusing the reflected light; and
    a strip reflector disposed in the path of the light, said strip reflector having a surface for adjusting the reflection of the light before the light enters the photographic negative.

2. The lighting attachment as recited in claim 1 additionally comprising an ellipsoidal reflector disposed at the light output of said strip reflector for directing the light to the photographic negative.

3. The lighting attachment as recited in claim 1 wherein said strip reflector comprises a reflective surface, two spaced apart parallel stationary walls mounted adjacent to said reflective surface and having shaft receiving apertures, a plate disposed between the stationary walls having corresponding shaft openings, said plate being spring supported between said walls, a plurality of shafts slidably disposed and guided through the shaft openings of said plate, said shafts including slides for projecting through the reflective surface, an elastic lining disposed in the shaft openings of said plate and frictionally engaging said shafts, a bell crank drive coupled to said plate and secured to said walls for displacing said plate with respect to said walls so that in one operating position of said plate, said shafts can be freely adjusted while in the other operating position the shafts are held in a fixed position by the elastic lining which exerts a one-sided pressure on the shafts when the plate is displaced by the bell crank.

4. The lighting attachment as recited in claim 3 wherein said strip reflector additionally comprises a retractor plate mounted adjacent to one of said parallel stationary walls and having apertures for slidably receiving said shafts and wherein said shafts comprise shaft heads larger than the apertures of said retractor plate, said retractor plate being freely displaceable in the direction of said shafts so that said retractor plate when displaced, engages said shaft heads to return all of said shafts to a fully retracted position with respect to the surface of said strip reflector.

5. The lighting attachment as recited in claim 4 wherein the elastic lining of said plate comprises a plastic material tightly encompassing all of said shafts when said bell crank is actuated.

6. The lighting attachment as recited in claim 5 comprising (reproducable) storage means for reproducing the various operating positions of the slides, having a housing, a storage plate held in suspension by springs within said housing, said storage plate including flush bearing apertures corresponding to the exact location of the apertures of said shafts, a plurality of sliders slidably disposed in the apertures of said plate and an arresting plate disposed in said housing for securing each of said sliders in a fixed position corresponding to a predetermined displacement of said shafts so that the location of said shafts can be determined.

7. The lighting attachment as recited in claim 4 wherein the shaft heads are constructed of iron.

8. The lighting attachment as recited in claim 7 wherein said strip reflector additionally comprises a cylindrical jacket which is open on its front face, a bar magnet displaceably mounted in said jacket and an arched spring coupled to said jacket and said bar magnet for displaceably moving said bar magnet within said jacket so that when the bar magnet contacts the iron head of said shaft, said shaft can be adjusted and when the bar magnet is retracted within said cylindrical jacket, said magnet disengages the shaft head.

9. The lighting attachment as recited in claim 1 additionally comprising filter means mounted between the light source and the input opening of said semi-spherical ball, said filter means having at least one pair of carriers spaced apart with respect to each other and movable toward each other, at least one filter mounted on each of said carriers so that opposed edges of said filters overlap once the carriers are moved toward each other across the path of the light beam from the light source.

10. The lighting attachment as recited in claim 9 wherein said carriers include an endless pull cable coupled to each of said carriers for displacing the carriers.

11. The lighting attachment as recited in claim 10 wherein said carriers support three pairs of dichroitic filters in three subtractive base colors so that said filters can be displaced to overlap with respect to each other.

12. The lighting attachment as recited in claim 1 comprising filter means with color filters disposed between the light source and the input opening of the semi-spherical ball having a plurality of pairs of pivotable carriers for supporting pairs of color filters respectively, said carriers moving relative with respect to each other to provide complete overlapping color filters so that the opposite edges of the filters move in a non-parallel path with respect to each other.

13. The lighting attachment as recited in claim 12 wherein said pivotable carriers additionally comprise springs urging said carriers toward each other so that said filters will overlap, a cam disk engaging said pivotable carriers for separating the carriers and their filters against the force of said springs and a lever drive coupled to said cam disk for rotating said cam disk to adjust said filters.

14. The lighting attachment as recited in claim 12 additionally comprising a rail engaging and guiding the free end of each of said pivotable carriers.

* * * * *